Patented Sept. 18, 1951

2,568,462

UNITED STATES PATENT OFFICE 2,568,462

2,4-DIAMINO-6-OMEGA-CARBOXYTRIHY-DROXYPROPYLPTERIDINE

Harold G. Petering and John A. Schmitt, Kalamazoo, Mich., assignors to The Upjohn Company, Kalamazoo, Mich., a corporation of Michigan No Drawing. Application July 22, 1950,
Serial No. 175,478

3 Claims. (Cl. 260—251.5)

This invention relates to 2,4-diamino-6-omega-carboxytrihydroxypropylpteridine more particularly having the formula:

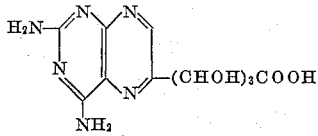

and to a method for its preparation.

The product of this invention is a brown to tan solid, soluble in aqueous alkalies and acids, sparingly soluble in water and relatively insoluble in most common organic solvents. It chars and decomposes without definite melting above 300 degrees centigrade and is best characterized by its ultraviolet absorption spectra and the ratio of the extinction coefficients at the maxima. This product is useful as an intermediate in the preparation of other chemical compounds, in particular 2,4-diamino-6-formylpteridine as is described and claimed in the copending application, Serial No. 175,476 filed July 22, 1950, and as an enzyme inhibitor and an antiviral agent.

This new product can be prepared by reacting in acid solution 2,4,5,6-tetraaminopyrimidine and 5-keto-gluconic acid in the presence of hydrazine, a reaction which is accelerated by moderate heating, as on a steam bath. When condensation is carried out at a pH of about 5.0 the product precipitates from the reaction mixture on cooling. The product thus obtained can be separated from adhering impurities by washing with water and organic solvents. A preferred method for the isolation of the product of this invention involves the use of boric acid as a precipitating agent as is described and claimed in the copending application of John A. Schmitt, Serial No. 175,480 filed July 22, 1950. According to this copending application the addition of boric acid to the reaction mixture forms a 2,4-diaminopteridine borate which is less soluble at pH 7.0 than is the 2,4-diaminopteridine base. There is thus obtained by this procedure, upon neutralizing and cooling the reaction mixture, a larger quantity of the 2,4-diaminopteridine than can be obtained without the use of boric acid. The product can be further purified if necessary according to known procedures such as solution in strong acid or alkali, decolorizing with adsorbent charcoal and recovering the pteridine by dilution of neutralization and filtration.

The following example illustrates a preferred method for the preparation of the product of this invention which can be modified as to various details, as will be apparent to those skilled in the art to which this invention pertains, without departing from the spirit and scope of the invention.

*Example.* — *2,4 - diamino-6-omega-carboxytrihydroxypropylpteridine*

To a dry mixture of 1.065 grams of 2,4,5,6-tetraaminopyrimidine hydrochloride, 1.36 grams of sodium acetate trihydrate, 2.36 grams of calcium 5-keto gluconate and 600 milligrams of boric acid a solution of 1.4 milliliters of glacial acetic acid, 0.6 milliliter of 85 percent hydrazine hydrate and ten milliliters of water was added. The resulting bright yellow solution had a pH of 4.5 to 5.0. The reaction mixture was warmed to 85–95 degrees centigrade for about 45 minutes, the solution becoming dark brown. Upon cooling a precipitate formed which was collected, washed twice with water, once with alcohol and once with ether. After drying at sixty degrees centigrade under reduced pressure there was obtained 1.74 grams of 2,4 - diamino - 6 - omega - carboxytrihydroxypropylpteridine as a light brown powder having ultraviolet absorption maxima in 0.1 normal NaOH solution at 257 mu and 370 mu, minima at 238 mu and 322 mu and an $$E\frac{257 \text{ mu}}{370 \text{ mu}} \text{ ratio of 3.1}$$

We claim:

1. A compound having the formula:

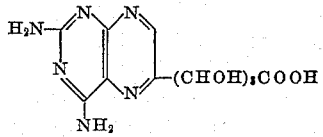

2. The process comprising heating in acid solution 2,4,5,6-tetraaminopyrimidine and a salt of 5-keto-gluconic acid in the presence of hydrazine and separating the resulting 2,4-diamino-6-polyhydroxyalkylcarboxypteridine from the reaction mixture.

3. The method of claim 2 wherein the salt of 5-keto-gluconic acid is the calcium salt.

HAROLD G. PETERING.
JOHN A. SCHMITT.

No references cited.